United States Patent
Radziewicz et al.

(10) Patent No.: US 8,385,516 B2
(45) Date of Patent: Feb. 26, 2013

(54) RINGBACK BLOCKING AND REPLACEMENT SYSTEM

(75) Inventors: Clifford J. Radziewicz, Hillsborough, NJ (US); Mark R. Gregorek, Mahwah, NJ (US); Jeffrey C. Dillow, Sparta, NJ (US)

(73) Assignee: eClips, Inc., Hillsborough, NJ (US)

( * ) Notice: Subject to any disclaimer, the term of this patent is extended or adjusted under 35 U.S.C. 154(b) by 1519 days.

(21) Appl. No.: 11/119,408

(22) Filed: Apr. 29, 2005

(65) Prior Publication Data

US 2006/0245571 A1    Nov. 2, 2006

(51) Int. Cl.
H04M 1/64    (2006.01)
(52) U.S. Cl. .............. 379/88.12; 379/76; 379/46
(58) Field of Classification Search .... 379/88.01–88.28, 379/76, 67.1
See application file for complete search history.

(56) References Cited

U.S. PATENT DOCUMENTS

| | | | | |
|---|---|---|---|---|
| 3,825,947 A * | 7/1974 | Rubin et al. | | 360/12 |
| 5,428,670 A * | 6/1995 | Gregorek et al. | | 379/67.1 |
| 5,521,965 A * | 5/1996 | D'Alessio et al. | | 379/209.01 |
| 5,557,658 A * | 9/1996 | Gregorek et al. | | 379/88.25 |
| 5,642,414 A * | 6/1997 | Kazemzadeh | | 379/377 |
| 5,966,651 A * | 10/1999 | Sibecas | | 455/412.2 |
| 6,157,640 A * | 12/2000 | Valentine | | 370/384 |
| 6,594,706 B1 * | 7/2003 | DeCoursey et al. | | 709/238 |
| 6,792,534 B2 * | 9/2004 | Medvinsky | | 713/171 |
| 6,816,737 B2 * | 11/2004 | Kim | | 455/466 |
| 6,988,246 B2 * | 1/2006 | Kopitzke et al. | | 715/810 |
| 7,032,028 B2 * | 4/2006 | Clay et al. | | 709/238 |
| 7,092,510 B2 * | 8/2006 | Hamilton et al. | | 379/266.01 |
| 7,095,826 B2 * | 8/2006 | Crockett et al. | | 379/88.12 |
| 7,224,788 B1 * | 5/2007 | Rhee et al. | | 379/207.02 |
| 7,360,160 B2 * | 4/2008 | Matz | | 715/716 |
| 2002/0181671 A1 * | 12/2002 | Logan | | 379/88.13 |
| 2004/0066924 A1 * | 4/2004 | Wertsberger | | 379/201.01 |
| 2004/0114732 A1 * | 6/2004 | Choe et al. | | 379/88.17 |
| 2004/0120494 A1 * | 6/2004 | Jiang et al. | | 379/210.01 |
| 2004/0141592 A1 * | 7/2004 | Blumenschein et al. | | 379/67.1 |
| 2004/0247093 A1 * | 12/2004 | Potts et al. | | 379/88.17 |
| 2005/0094796 A1 * | 5/2005 | Beauford | | 379/211.01 |
| 2005/0105706 A1 * | 5/2005 | Kokkinen | | 379/201.01 |
| 2006/0203985 A1 * | 9/2006 | Beauford | | 379/211.01 |

* cited by examiner

Primary Examiner — Yuwen Pan
Assistant Examiner — Assad Mohammed
(74) Attorney, Agent, or Firm — Ward & Zinna, LLC

(57) ABSTRACT

A smart ringback blocking and replacement system for delivering and/or selectively blocking signal content from a communications network is disclosed. Communications devices interact with the smart ringback blocking and replacement system to allow for modifications of the network service.

31 Claims, 12 Drawing Sheets

RINGBACK BLOCKING AND REPLACEMENT SYSTEM

FIELD OF THE INVENTION

The present invention relates generally to the customization of a communications network and, more particularly, to the customization of a communications network including custom call signals and the system for delivering and/or selectively blocking custom call signals and announcements.

BACKGROUND OF THE INVENTION

Most conventional communications networks today, particularly existing telephone networks, provide a calling party with an audible ringback signal when an intended called network address or station line is idle and a busy signal when the intended called network address or station line is already in use (i.e., the telephone or other device at the called network address is being used). Most conventional communications networks also provide a calling party with an audible ringback signal when an intended called station or network address is out of order, unassigned, outside the network calling area, or otherwise unavailable or unreachable. Conventional networks may also provide a calling party with an audible dial tone signal when the telephone or other device at the calling station signals the network that they wish to initiate a call or network communication and a line is available. Most conventional communications networks today, particularly existing telephone networks, also provide advanced features, such as call waiting. The call waiting feature allows a station or device already connected to another station or device to temporarily disconnect from a first call and receive a second incoming call, and then switch between the calling parties.

For example, U.S. Pat. Nos. 5,557,658, 5,428,670, and 5,321,740 to Gregorek et al., incorporated herein by reference, disclose the selective modification or replacement of at least a portion of a call progress signal, including the conventional aforementioned ringback signal, dial tone, busy signal, call waiting signal, and call waiting idle time, with prerecorded announcements and/or audio/video programming. These announcements and/or programming provide more information to a calling party. The replacement announcements and tones can be tailored to a specific calling party and can be associated with a calling party's unique network address or telephone number.

Custom ringback announcements allow for an additional level of flexibility and personalization of a user's communications network service. To customize the system, a user of a replacement ringback system, the network provider, or a third party might wish to deliver, for example, audio/video programming, music, interactive games, jokes, personalized messages, or informational messages to a calling party to supplement and/or replace the conventional ringback tones played to the calling party. Furthermore, replacement content can be customized for a specific calling party or group of calling parties. The replacement ringback system offers a convenient and simple way to extend a caller's communication experience and takes advantage of a previously unutilized call transmission period.

In addition, replacement ringback tones and announcements offer almost limitless applications in the marketing industry. Typically, a caller experiences a rather large amount of unused idle time when waiting for a called party to answer his or her telephone. A caller may also be put on hold for several minutes while the called party answers another inbound call (e.g., a called party may place an initial caller on call-waiting or hold to answer a second inbound call). Since ringback tones can be played to all parties, regardless of the called party's or calling party's own carrier or calling transmission means (i.e., whether the caller is calling from a wireless link or land line, etc.), replacement ringback tones are an ideal medium for advertising. Substantial revenue can be gained by taking advantage of this idle time to deliver advertisements pertaining to consumer goods, products, services, etc. provided by a particular corporation or individual. Further, since communication devices are virtually ubiquitous and universally used, ringback tones have the potential to reach a large, targeted audience very quickly and efficiently. For example, businesses may use replacement ringback tones to deliver company slogans, jingles, and promotions to increase exposure and publicity.

As the adoption of the technology identified in the above-referenced application is emerging, certain drawbacks in the functionality of the application are arising. For example, many users become frustrated or confused when they hear custom replacement ringback content. These callers may prematurely terminate a call thinking they have reached an incorrect number. In addition, in many instances the replacement ringback announcements may be configured to be delivered to calling parties based on global rules or criteria (e.g., time-based rules or geographic area (area-code) based rules). Many times, the replacement ringback content is inappropriate for a caller even though the caller matched some user or system defined criteria. As well as potentially being inappropriate, the replacement content to be delivered to a caller may be offensive, distasteful, or otherwise unwanted by the caller. Methods for selectively screening programming material are known in the art. For example, a material content signal may be added or incorporated into programming material as it is transmitted to a receiver. The receiver is then equipped with program material screening devices capable of detecting the material content signal and preventing receipt of the program material. It would be advantageous, however, if a user of a communications station, the network provider, or a third party, could configure a system to selectively block or filter ringback and other call signals delivered from called parties to the user's communications station without the use of an additional material content signal. This would be useful to prevent unsolicited, undesired, or offensive call signals.

In addition, conventional ringback replacement systems are typically limited to delivering announcements as standard ringback signals (i.e. the announcements are delivered to a calling station from a called station or network peripheral while the station is attempting to establish a connection with the called station). There are, however, many other times when it would be beneficial to deliver announcements from the communications network to a communications station. Since typical communications stations are idle for the majority of each day while no calls are being placed or received, it would be beneficial to utilize this unused idle time to deliver custom call signals (e.g., advertisements, music, video, sound effects, etc.) to entertain, inform, or educate the user.

There are also other times when it might be advantageous to deliver custom call signals to communications stations. A typical communications station remains idle while a user is inputting a network address to be called or dialed. Traditional ringback replacement systems cannot deliver call signals and announcements during this time. However, this time period accounts for a large percentage of the unused idle time experienced by a communications station. It would be advantageous if calling stations could also receive and display announcements while inputting or dialing a network address.

It would be advantageous if a user of a communications network could access a simple system for establishing custom announcements to be delivered to the user's own communications device. It would also be beneficial if this system could deliver announcements to a communications station while the station is idle, being used to input a network address, as a replacement ringback signal, or at any other convenient time. It would further be advantageous if the system included functionality for selectively blocking or filtering unwanted ringback signals destined for a user's own communications station without the need for incorporating a separate material content signal into the announcement. Thus a seamless system is needed that may be configured directly from the communications network, a user's handset or station, or a third party location, for delivering and/or blocking announcements delivered to a user's communications station.

SUMMARY OF THE INVENTION

The present invention comprises a smart ringback blocking and replacement system, which is capable of delivering announcements to at least one communications station matching some station status. The present invention further comprises a system for adding media content or announcements to a subscriber's network service directly from the subscriber's handset or station. Media content or announcements (also referred to as media files, signals, call signals, and content signals) could comprise audio (e.g., music, jingles, sound effects, or live or prerecorded voice), video (e.g., interactive games, movie clips, or live or prerecorded video), data (e.g., pictures, computer screen shots, electronic documents, spreadsheets, databases, etc.) or a combination of audio, video, and data, as well as other programming material. The present invention is also directed toward a system for selectively blocking or filtering unwanted ringback signals from other parties and services.

The present invention also comprises a system for delivering media content and announcements to at least one communications station at any desirable time. The system may deliver media content and announcements when the station is not currently in use (i.e., the station is not in the process of making or receiving a call), when a network address is being inputted or dialed, when the station is waiting for a called party to answer, or any other convenient time. The system is configured by creating smart associations between certain communications station events and the media content or announcements desired to be delivered to the associated communications stations as these station events occur.

Smart associations are simple logic used to determine what media content or announcements are delivered to which communications stations matching certain communications station events. Smart associations may be based on a wide variety of criteria, including, but not limited to, date and time information, called or calling party network address data, geographic location data (e.g., area code information), or any other data capable of being ascertained or read by the system. External databases or data sources and user-supplied or user-derived data may also be queried for use as additional association criteria. For example, a smart association might specify that a certain video advertisement is to be played to the communications station identified by network address "192.168.6.9" while station "192.168.6.9" has an "idle" status (i.e., while the station is not making or receiving a call). Another ringback association might specify the playing of The Star-Spangled Banner to all communications stations when the stations have a "ringback" status (i.e. while the station is waiting for another called station to answer) on July 4 of each year. The present invention may be accessed via hard or soft keys on a user's handset, an attachable keypad or keyboard, a voice-activated speech recognition module, or like modes of access, or the present invention may be under the control of an originating network service provider, intermediate network service provider, terminating network service provider, or third party. Based on the input, the system may connect to a local or remote storage device for the subscriber to select a desired media file or announcement (for example, a video clip, music, an advertisement, an interactive game, news footage, or some other programming material). The subscriber, network provider, or third party can input or automatically choose (e.g., by speaking predetermined voice commands translated to common phonemes) a desired station event status to be associated with the previously selected media file or announcement. As a result, the user's communications network (or a third party communication network service provider contracted to provide announcement services on behalf of the user's communications network) delivers the newly associated announcement or media file to the user's communications station while the event status of the user's communications station matches the event status contained within the smart association. As another example, a user, the network service provider, or a third party may create a smart association that specifies delivery of a specific sound effect to communications station "212-859-1212" while communications station "212-859-1212" exhibits a "dialing" status (i.e., while a user of the station is inputting or dialing a network address). The present invention may monitor the station status of communications station "212-859-1212" until the station enters a "dialing" status. At this time, the sound effect will be delivered to and displayed on the communications station.

Typically, end users of the present invention are authorized to create smart associations relating to their own communication station(s). However, the present invention features an authorization routine, which may validate, grant, and revoke authorization levels for access to other communications stations on a user, station, or location basis, as desired. Hence, users may create, modify, or delete smart associations for a single authorized station, all authorized stations, or groups of authorized stations. For example, an advertiser, who is authorized by an administrator or the network service provider to add a smart association pertaining to all communications stations within the New York City area code on January 1, may create an association for content delivery affecting those stations specified within the authorization level afforded to the advertiser. The present invention may also be programmed to pre-select content to be delivered to communications stations matching some criteria established by the network service provider. Users of the present invention include any end user, such as subscribers to the network service provider, as well any originating, terminating, or intermediate network service providers themselves, and third party users, such as advertisers.

The present system is also directed to a ringback blocking and replacement system which is capable of modifying currently associated station status events with new media content or announcements (or revert to conventional tones) directly from a user's handset or station. The subscriber selects the currently associated station event status and then chooses a new replacement media file or announcement. The system then delivers the newly-associated file or announcement to the subscriber's station while the station matches the associated station event status. For example, a user, who has an affinity for classical music, might update the user's "idle" smart association with new classical releases as they become available.

BRIEF DESCRIPTION OF THE DRAWINGS

A further understanding of the present invention can be obtained by reference to a preferred embodiment as set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the specific methods and instrumentalities disclosed.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems, and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for the purposes of disclosure and to provide a basis for the claims herein, which define the scope of the present invention. The following presents a detailed description of a preferred embodiment (as well as some alternative embodiments) of the present invention.

Figure 1:
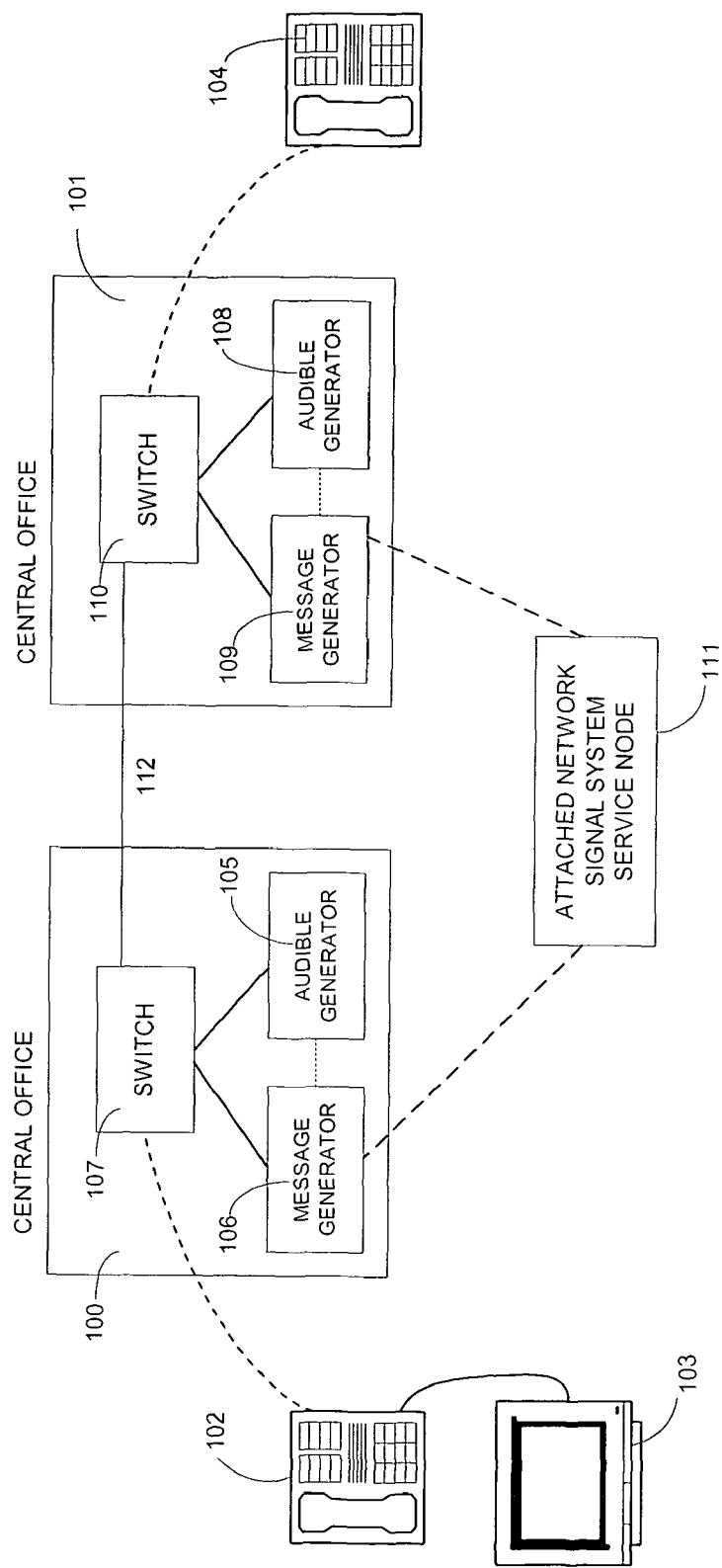
FIG. 1 (PRIOR ART) is a block diagram of a common ringback replacement system.

Referring to the drawings wherein like numerals indicate like elements throughout, there is shown in FIG. 1 (PRIOR ART) a conventional network-originated system for supplying replacement ringback content in accordance with a typical ringback control system. As is well known in the art, when a user of first telephone 102 initiates a call, a connection is formed with first switch 107 at first local central office 100, which is usually associated with a local telephone company. First switch 107 typically transmits a dial tone back to first telephone 102 to indicate the availability of the telephone service. The telephone number dialed or otherwise entered by the calling party using first telephone 102 or an associated device is transmitted to local central office 100 as a series of signals which are detected by first switch 107. First switch 107 refers to a network control point, network controller, or communications network traffic switching and control mechanism, such as a central office or premises-based audio, data, video, or hybrid switch, a packet switch, or Asynchronous Transfer Mode (ATM) switch, or any associated signaling network control point, service control point, or service switching point or system which routes, monitors, and/or handles and controls calls over a communications network. First switch 107 is responsible for determining the destination (network address) of the call based upon the transmitted signal (i.e., the number dialed). First switch 107 transmits the call initiated by the user of first telephone 102 over communications network 112 toward an identified network address or called station, which in the present embodiment comprises second telephone 104, but could comprise any other type of communication device. The called network address or station is identified by the telephone number or network address entered by the calling party at first telephone 102. Communications network 112 could be a local exchange network, interexchange network, long distance network, international network, telecommunications network, cable television network, broadcast network, switched network, dedicated network, the Internet, Voice over IP (VoIP) network, wireless network, Wi-Fi network, WiMAX network, or a hybrid type of the foregoing networks or any network similar to the aforementioned networks.

The call from the calling party is received by second switch 110 located at second local central office 101 which determines the status of second telephone 104 (i.e., whether second telephone 104 is in a busy state or in an idle state). Attached network signaling system service node 111 can also determine the busy/idle status of the called network address or station line. The specific procedure by which second switch 110 or attached network signaling system service node 111 determines the busy/idle status of the called network address or station line is common and well-known to those skilled in the art.

Depending upon the configuration of the network, either first audible signal generator 105 and first message generator 106 or second audible signal generator 108 and second message generator 109 can transmit the call progress signals to the user of first telephone 102. For the purposes of discussion, when a user of first telephone 102 initiates a communication session with second telephone 104, second audible signal generator 108 and second message generator 109 may provide signals and/or announcements to the user of first telephone 102. Second message generator 109 is connected to second switch 110 and is capable of supplementing and/or replacing the signals generated by second audible signal generator 108. Second switch 110 or attached network signaling system service node 111 determines whether second audible signal generator 108 or second message generator 109 is activated. When a user of first telephone 102 initiates a communication session with second telephone 104, second switch 110 or attached network signaling system service node 111 activates second audible signal generator 108 to provide a conventional audible ringback signal and activates second message generator 109 to play a series of prerecorded announcements (i.e., replacement ringback content) to the user of first telephone 102. First telephone 102 may also be attached to display 103 for the transmission of video signals. Display 103 may optionally be built-in to or integrated with first telephone 102. It is to be understood that the signal generation functions of second audible signal generator 108 and second message generator 109 could alternatively be provided by third-party or outside audible signal and audio/video message generators as required by the communications network.

In most wireless, cellular, and trunked telephone networks, upon network access the transmission of a dial tone by first switch 107 is suppressed. In addition, typically the busy/idle status of second telephone 104 determines if a caller to a wireless or cellular station is automatically transferred to a network voice mail system; if a user's communications station is busy, off-line, powered off, or cannot be located, a caller is most often redirected to a network voice mail box in lieu of the transmission of a busy signal. Message generator 109 may similarly deliver announcements to users calling wireless, cellular, or trunked stations before, after, or during any transfer to a network voice mail service.

Announcements are enabled by inserting a software subroutine into the call processing software of the network. The various mechanisms for incorporating software into the call processing system of the network are well-known to those skilled in the art. The software subroutine causes call processing procedures to be modified and allows first message generator 106, second message generator 109, or a third-party message generator to become an integral part of the call completion sequence.

Second message generator 109 can also play certain messages based on the time of day, day of week, month of year, or any other time frame reference or window. An integrated or external clock may be synchronized with second message generator 109 for monitoring the time of day, day of week, and month of year. When a call is placed to second telephone 104 from first telephone 102, and second message generator 109 has been signaled to initiate a message sequence, the information from the clock is read by second message generator 109 and is compared to information located in a look-up table in the memory of second message generator 109 to determine which messages are to be played. For example, a user of the present system could specify a prerecorded video to be transmitted to a calling party calling the user from video-telephone number "212-555-1212" on January 25 of each year (the user's birthday, for example) whenever video-telephone "212-555-1212" calls the user on January 25. As another example, a user could specify a certain holiday music clip to be delivered to all callers calling on Christmas Day, and a different music clip to be transmitted on all other days.

Second message generator 109 retrieves designated messages until second telephone 104 is answered or the calling party abandons the call. It should be appreciated that, if desired, live announcements may be provided under the control of second message generator 109.

If second message generator 109 is set to determine which announcements are to be played based upon the area code and telephone number of first telephone 102, second message generator 109 can read the telephone number of the calling party as provided by the telephone network (e.g., second message generator 109 can use an automatic number identification (ANI) system or similar identification system(s) which are well-known in the art to identify the area code, telephone number, or other characteristics of the calling party) and determine the geographical location of the calling party by matching the telephone number with a location provided by an updateable look-up table linked to second message generator 109 and maintained by the central office, an affiliate thereof, or other third party. Second message generator 109 determines which announcements are designated for a particular area code and telephone exchange and plays the appropriate prerecorded messages until second telephone 104 is answered or until the calling party abandons the call.

It should also be appreciated that the present invention is not limited to traditional telephone networks (for example, PSTN or the like). With the evolution of enhanced services and the convergence of telephony with data interfaces, today's networks are increasingly merging with standard Internet protocols for signaling and media. It is now common in the art for some of these networks to allow for the separation of the signaling from the media transport. For example, an increasing number of Competitive Local Exchange Carriers (CLECs) and Internet Telephony Service Providers (ITSPs) are offering such services as local and long distance telephony, Voice over IP (VoIP), presence and instant messaging, push-to-talk, rich media conferencing, and more, based on Session Initiation Protocol (SIP). Unlike traditional telephone networks, users of SIP-based networks can locate and contact one another regardless of media content and the number of participants.

Figure 2:
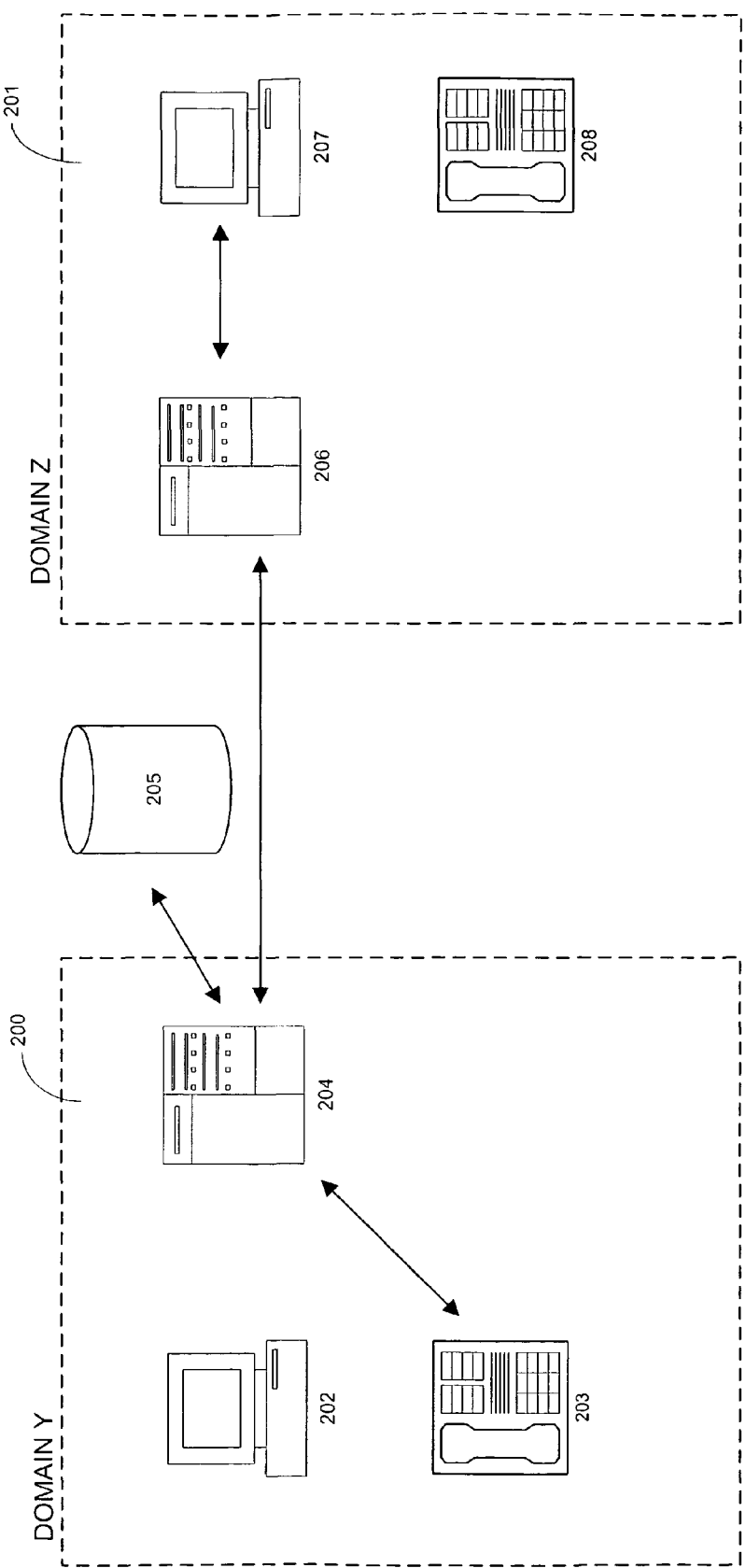
FIG. 2 is a block diagram depicting user agents in different domains delivering custom announcements.

For example, FIG. 2 illustrates the interaction between two SIP-based user agents (each with a SIP address, such as sip:user@localhost.com) while establishing a communication session in different domains. SIP user agents may be any end-user devices, such as wireless telephones, multimedia handsets (e.g., video telephones), mobile computers, PDAs, or any other devices capable of creating and managing SIP sessions. As illustrated in FIG. 2, user agents 202 and 203 are located within first domain 200 and user agents 207 and 208 are located within second domain 201. User agent 203 within first domain 200, in attempting to establish a communication session with user agent 207 located in second domain 201, first contacts SIP proxy server 204 located within first domain 200 of user agent 203. SIP proxy server 204 may be any packet switch, proxy server, gateway, service control point, softswitch, call controller, or other like structure. SIP proxy server 204 recognizes that user agent 207 is outside its own domain and contacts SIP redirect server 205 for the network address of user agent 207. SIP redirect server 205 may be located in either first domain 200 or second domain 201 (or both domains) and responds to the proxy server's request with user agent's 207 contact information (e.g., current IPv4 or IPv6 address). SIP proxy server 204 forwards a session invitation to SIP proxy server 206 located in domain 201 identified by the contact information received from SIP redirect server 205. The invitation may include a session description (perhaps written in Session Description Protocol (SDP) format) that provides the called party with enough information to join the session. For multicast sessions, the session description enumerates the media types and formats that are allowed to be distributed to that session. For a unicast session, the session description enumerates the media types and formats that user agent 203 is willing to use and the desired location to send the media data.

Next, SIP proxy server 206 delivers the session invitation to user agent 207. If the session invitation is acceptable to user agent 207, user agent 207 creates an acknowledgment reply and forwards the reply back to SIP proxy server 206. Finally, SIP proxy server 206 forwards the acknowledgment back to SIP proxy server 204 located in first domain 200. SIP proxy server 204 then relays the acknowledgment back to the initiating user agent 203. User agents 203 and 207 may then create a point-to-point communication connection (e.g., using Real-Time Transport Protocol (RTP) or any other protocol or delivery method supported by user agents 203 and 207) enabling the two user agents to interact. Once a point-to-point connection is established, replacement ringback announcements may be delivered to user agent 203 from a variety of sources. For example, replacement ringback announcements may be delivered directly from user agent 207 when the underlying protocol signals user agent 207 to deliver its ringback announcement. Alternatively, replacement ringback announcements may be delivered to user agent 203 on behalf of user agent 207 from a network server, application server, media server, dedicated ringback server, or from a third-party server.

Figure 3:
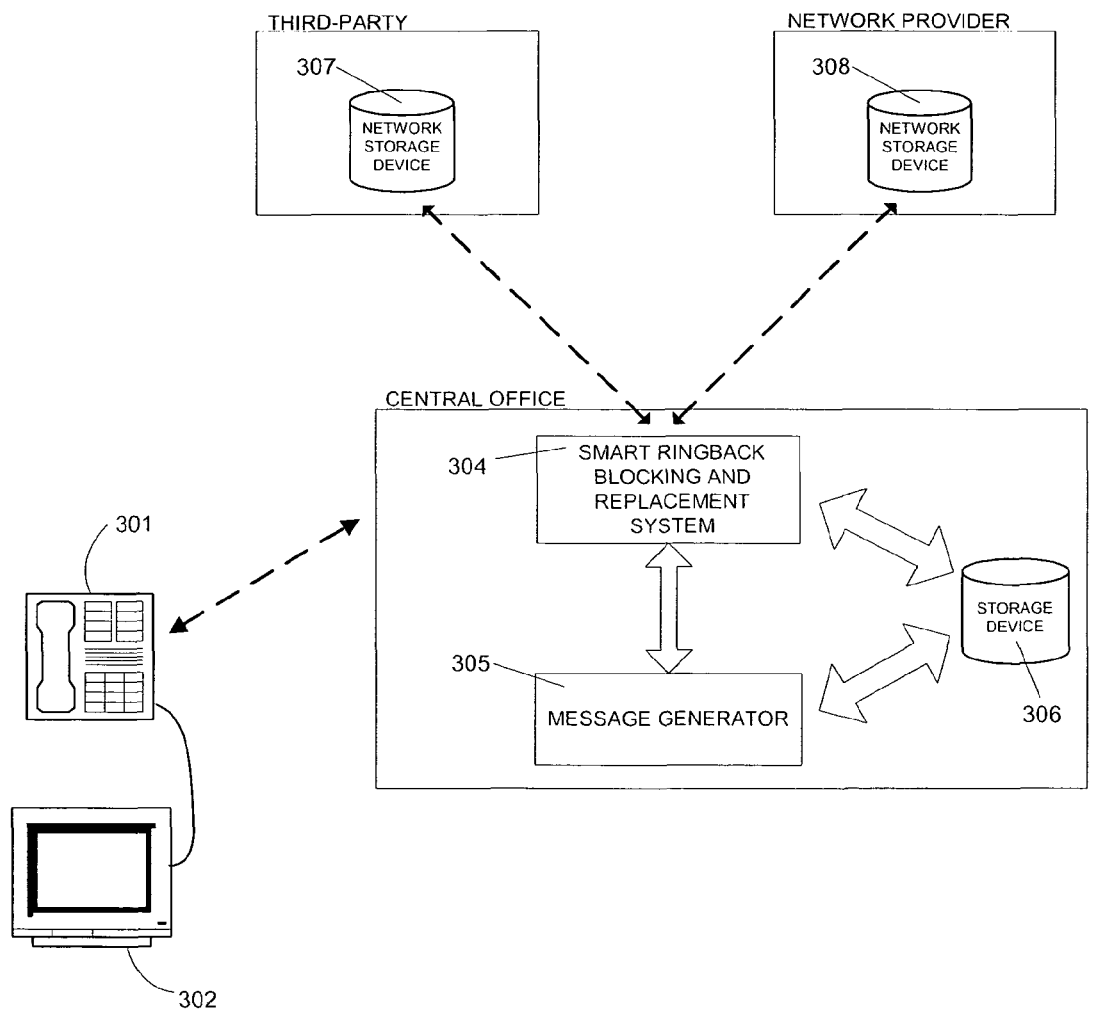
FIG. 3 is a block diagram in accordance with the smart ringback blocking and replacement system of the present invention.

Now referring to FIG. 3, a schematic block diagram of the smart ringback blocking and replacement system is shown in accordance with the preferred embodiment of the present invention. The present invention is designed for use with any type of communications network including any network capable of transmitting voice, data, video, multimedia, real time, store and forward, interactive, hybrid types of information, or other similar information services. The communications network may be provided by a private or publicly-owned local exchange, interexchange, long distance, international, telecommunications, cable television, broadcast, switched, dedicated, wireless, Voice over IP (VoIP), Wi-Fi, WiMAX, hybrid types of network providers, or other like networks. The communications network provided by these network providers may utilize wireless, facilities-based, satellite-based, hybrid types of transmission schemes and/or mechanisms, or other systems of similar function. For the sake of brevity and simplicity, the embodiments of the invention illustrated in the figures are specifically directed to a standard or typical telephone system used for providing voice communication between two individual network addresses (e.g., in the present embodiment, these network addresses correlate to telephone stations or telephones). However, it should be clearly understood by those skilled in the art from this disclosure that the present invention is not limited to access from such standard telephone stations or to telephone station communications systems. In addition, while in the described embodiment the telephone stations are illustrated as being typical or standard telephone instruments, the terms "station," "handset," and "device" could refer to any device or object which may be connected to or be an integral part of a communications network. A communications network may allow for the initiation, receipt and/or interaction of audio and/or visual information. This information may include voice, data, video, multimedia, real-time, store and forward, interactive or hybrid types of information. It should also be clearly understood that the terms "station," "handset," and "device" should be read to include, but not be limited to, devices such as wireless or cellular telephones, personal digital assistants, digital personal organizers, televisions, video monitors, video telephones, computers, multimedia handsets, television set-top converters, modems, video servers, front end processors, other communications networks, and combinations or hybrids thereof.

Still referring to FIG. 3, smart ringback blocking and replacement system 304 is in communication with storage device 306 and message generator 305. As is common in the art, storage device 306 maintains signal content on behalf of the subscribers of the service in indexed files. Although storage device 306 is depicted as an internal central office device (perhaps located within a network host, media server, controller, etc.) it is contemplated that storage device 306 may be external to the central office. Storage device 206 may hold user-created announcements, such as video clips or voice messages, as well as downloaded announcements, such as music clips, advertisements, music videos, interactive games, and news bulletins and footage, for example. As also known in the art, each file of signal content can be accessed by a unique identification number or name, assigned either by the communications service provider or by storage device 306. By pressing a hard, soft, or touch key on telephone 301, or through the use of an attachable input instrument or voice recognition module (or like device), telephone 301 may connect to the smart ringback blocking and replacement system 304. Smart ringback blocking and replacement system 304 is also optionally in communication with remote storage device 308 operated by a communications network provider and remote storage device 307 operated by a third-party. Smart ringback blocking and replacement system 304 can access signal content from one or more of storage devices 306, 307, and 308. In the preferred embodiment, smart ringback blocking and replacement system 304 communicates with remote storage devices 307 and 308 via a wireless link comprising part of a Cellular Digital Packet Data (CDPD), High Speed Circuit Switched Data (HSCSD), Packet Data Cellular (PDC), Time Division Multiple Access (TDMA), Code Division Multiple Access (CDMA), 1×RTT, Global System for Mobile Communications (GSM), General Packet Radio Service (GPRS), Bluetooth, Wi-Fi, WiMAX, 2G, 3G, Local Multipoint Distribution Service (LMDS), Multichannel Multipoint Distribution Service (MMDS), or other wireless network, including protocols not yet implemented, or the equivalent thereof. It will also be appreciated by those skilled in the art that smart ringback blocking and replacement system 304 could communicate with storage devices 307 and 308 through a portion of any wired or wireless communications network over any communication or network protocol designed for data transmission.

Telephone 301 could also be connected to (or comprise an integrated) video display unit 302, such as a computer terminal, video terminal, LCD screen, LED display, plasma display, telephone monitor, or matrix display for the transmission of video signals. It is to be understood by those skilled in the art that smart ringback blocking and replacement system 304 is not limited to access from a conventional wireless telephone device. For example, the smart ringback blocking and replacement system 304 can be accessed from any state of the art communications device, including web-enabled wireless telephones, video telephones, mobile and desktop computers, and digital personal assistants or hybrid devices with telephony or communications capabilities.

Smart ringback blocking and replacement system 304 may constantly (or at regular or variable intervals) monitor the status of every communications device registered or subscribed to the smart ringback blocking and replacement service. Registration in the preferred embodiment is automatically configured by transmitting a registration message (e.g., an email, SMS text message, or IP datagram) to smart ringback blocking and replacement system 304 containing the network address of the communications device to be registered. In the preferred embodiment, smart ringback blocking and replacement system 304 may query each registered communications device for its station status at regular intervals. Query intervals of several hundred milliseconds may be used for optimal status accuracy; however, any expedient query interval may be used, as established or defined by a user of the system or through global system configuration settings (e.g., as stored in the service configuration file). In alternate embodiments, variable query intervals may be used depending on the network load, type and speed of connection to the system, and other factors. In addition, the query process may be initiated by smart ringback blocking and replacement system 304 or status messages may be sent by telephone 301 at regular intervals to smart ringback blocking and replacement system 304 without any prompting or requests from smart ringback blocking system 304. To save network bandwidth, telephone 301 may also deliver its current station status only when the status of telephone 301 changes. Thus, the system may assume that the status of telephone 301 remains unchanged until it receives an updated status message for telephone 301. A network host, server, or controller may also be utilized to collect station status messages over the communications network. Regardless of the query interval or method used, smart ringback blocking and replacement system 304 may access (or query to access) the current station status of each registered communications station. The status of each registered station may be additionally saved in memory or storage for quick lookup as required or desired by smart ringback blocking and replacement system 304. The current status associated with each registered station may be stored in a database, table, file, or any other common storage device located within telephone 301, storage device 306, network storage device 307, network storage device 308, or any other storage or memory location accessible by smart ringback blocking and replacement system 304 or telephone 301.

In the preferred embodiment, status messages may be delivered to smart ringback blocking and replacement system 304 over a standard IP-based packet network (as may be the case for a VoIP communications network). A status message, in its simplest form, may comprise two fields, such as an 8-bit station status field followed by a 128-bit network address field. The length and number of the fields within the status message are network dependent and may be extended to support additional functionality or heterogeneous networks. The 8-bit status field in the preferred embodiment may allow for up to 256 different station status indicators. The 128-bit network address field in the preferred embodiment may allow for a standard IPv6 address representation (as well as an IPv4 network address or other similar network address). This field corresponds to at least one communications station or device. It should be clearly understood that status messages may comprise any desired format and be of any desired length.

In the preferred embodiment, at least five station status indicators may be built into smart ringback blocking and replacement system 304 for use in creating smart associations. It should be clearly understood that station status indicators may be added, changed, removed, supplemented, or redefined at any time as applicable to the type of communications network, type of communications station, type of announcement being delivered, or any other criteria. The "idle" status is defined for communications stations that are not actively utilizing the communications network (i.e., are not connected to another station or in the process of placing or receiving a call). The "ready" status is defined for stations attempting to initiate access to the communications network and a line is available (i.e., when the traditional dial tone signal would be ordinarily delivered to the station). The "dialing" status is defined for stations in the process of inputting or dialing a network address to call. The "ringback" status is defined for stations waiting for a called party to answer (i.e., when the traditional ringback signal would be ordinarily delivered to the station). The "busy" status is defined for stations currently on a call, on hold within the network, or when the station is powered off.

A smart association may optionally include an "expiration" attribute timestamp, which causes the smart association to expire (or become invalid or otherwise automatically deleted or removed from the system) as the association expires. Expiration timestamps in the preferred embodiment are represented as 64-bit unsigned fixed-point numbers in seconds relative to 0-hour on Jan. 1, 1900, but may be represented in any convenient format or size.

A smart association or station status may additionally include a "blocking" attribute, which serves to filter out, mute, or otherwise block all content signals received by telephone 301 matching the "blocked" smart association (or when the telephone 301 has the "blocking" status attribute set). In the preferred embodiment, this attribute is represented as a simple boolean value (i.e., either "true" or "false"), but other representations are expressly contemplated. While telephone 301 exhibits a station status included in a smart association and this "blocking" attribute is set, smart ringback blocking and replacement system 304 may disable incoming signals to telephone 301 matching the attribute. In the preferred embodiment, smart ringback blocking and replacement system 304 may simply mute or filter out the signal at telephone 301 or at the central office or network service provider. As is common in the art, muting entails blocking the user from seeing, hearing, reading, or otherwise perceiving the muted or blocked signal. As the need permits, more sophisticated disabling mechanisms may also be used. For example, in another embodiment, the entire unwanted content signal is isolated through an analysis of singaling packet headers and then removed from the received communication altogether (either at the central office, at telephone 301, or any convenient location in transit). In the unwanted content's place, traditional call signals or custom content selected by the user, the network provider, or a third party may be inserted by smart ringback blocking and replacement system 304, if desired. Otherwise, the blocking function may act to deliver a silent announcement or no announcement at all. In other embodiments, active disabling means may be used, including, but not limited to, wireless signal jamming, frequency filtering, or other like signal blocking mechanisms to prevent the "blocked" signal from being received by telephone 301.

For example, a user, the network provider, or a third party may create a smart association for a communications stations with the "blocking" attribute set and associate this smart association with the "ringback" station status. This smart association may cause smart ringback blocking and replacement system 304 to effectively block, mute, filter, or remove the received call signal during the time when the user is waiting for a called party to answer. The unwanted or undesirable signal may be removed until a network connection is established to the dialed station. This provides a simple way for a user, the network provider, or a third party to filter out unwanted, inappropriate, or offensive signals.

Simple logic within smart ringback blocking and replacement system 304 compares the current station status of all registered stations (including telephone 301) with all the smart associations located on or created within the network. Each registered station's identification information (which may comprise the station's telephone number, network address, or any other identifying means capable of being ascertained by the communications network or by smart ringback blocking and replacement system 304) may also be used as criteria in the smart association comparison. These forms of identification may be acquired through Automatic Number Identification (ANI), caller ID, an analysis of packet headers, or other like means of identification as common in the art. If the status and/or identification of registered telephone 301 matches a valid smart association, message generator 305 delivers the appropriate content to telephone 301 until the status of telephone 301 no longer matches the status associated with the smart association (or the user signals the system to terminate the announcement). Message generator 305 may deliver the signal content over a portion of the main communications network accessible by telephone 301, an ad-hoc network specifically designed for delivering signal content to telephone 301, or via any other network or protocol capable of transmitting data. The signal content may be delivered in-band via the standard communication network signaling protocols, out of band on a separate, dedicated channel or path (as in SS7 out-of-band signaling), via IS-41 messaging, or through any other signaling, messaging, or data transfer protocol or standard compatible with telephone 301, including Channel Associated Signaling (CAS), Common Channel Signaling (CCS), Short Messaging Service (SMS), Enhanced Messaging Service (EMS), or Multimedia Messaging Service (MMS). Communications network signaling and messaging protocols are well-known in the art and will not be discussed further.

When telephone 301 initiates a call sequence, ringback blocking and replacement system 304 may temporarily disconnect or reroute the call at a network access point in order to play an announcement. The call may be bridged to an announcement or third party server in lieu of message generator 305 delivering the announcement. The announcement to be played and its location are specified by the user of telephone 301, the network service provider, or a third party within a smart association. When the called party answers, the network access point may disconnect the announcement server from telephone 301 and reestablish a connection with the called party.

Figure 4:
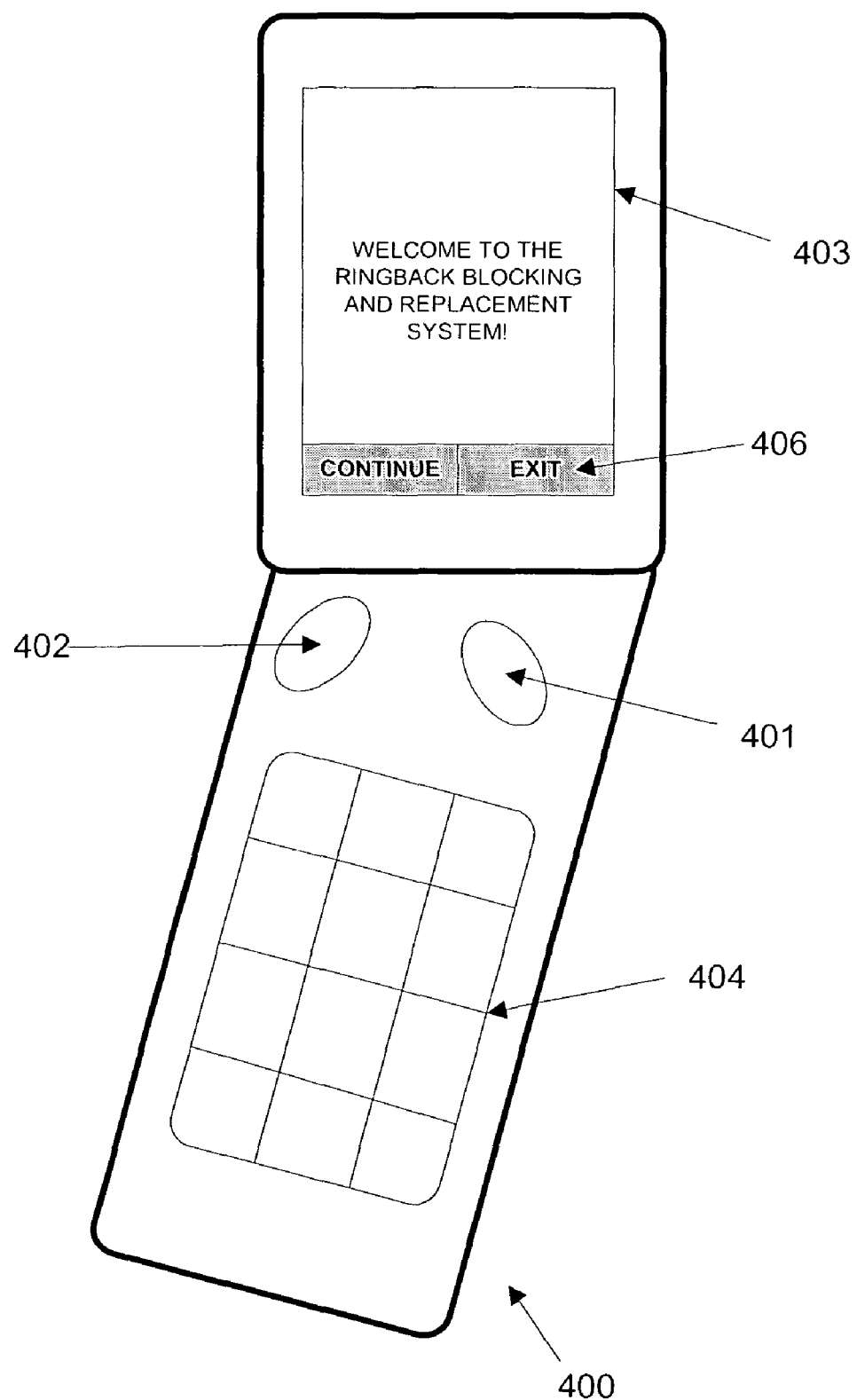
FIG. 4 depicts an example of a wireless telephone with a display and hard, soft, and touch keys that may be used to activate and interact with the smart ringback blocking and replacement system.

As shown in FIG. 4, depicted is wireless telephone 400 with integrated display 403 used in accordance with the preferred embodiment of the present system. Integrated display 403 can be a liquid crystal, LED, plasma, active-matrix, flat-panel, or any other display or device used to display information to a user, such as output video or graphical signals. Integrated display 403 can further comprise a touch screen. In this scenario, the ringback system may be accessed by a user touching a pen or stylus to the appropriate touch buttons 406 on the touch screen. Navigation and data entry are also supported via touch buttons preferably positioned on integrated display 403. Alternatively, the user accesses the smart ringback blocking and replacement system by utilizing soft keys 401 or hard keys 402 integrated within or positioned local to keypad 404. Wireless telephone 400 may also include a secondary attachable keypad or keyboard that facilitates access to and use of the smart ringback blocking and replacement system. In addition to using hard, soft, touch, or attachable keys, a user of smart ringback blocking and replacement system may use a voice recognition module integrated within wireless telephone 400 to access, navigate, and input selections into the handset-originated ringback replacement system. As is well-known in the art, speech recognition may be used to dial telephone numbers, access applications and features, navigate screens, and input data. With the use of voice recognition, a user may access and control the present system without the use of a traditional input device; however, a combination of the input systems and methods may be utilized.

Figure 5:
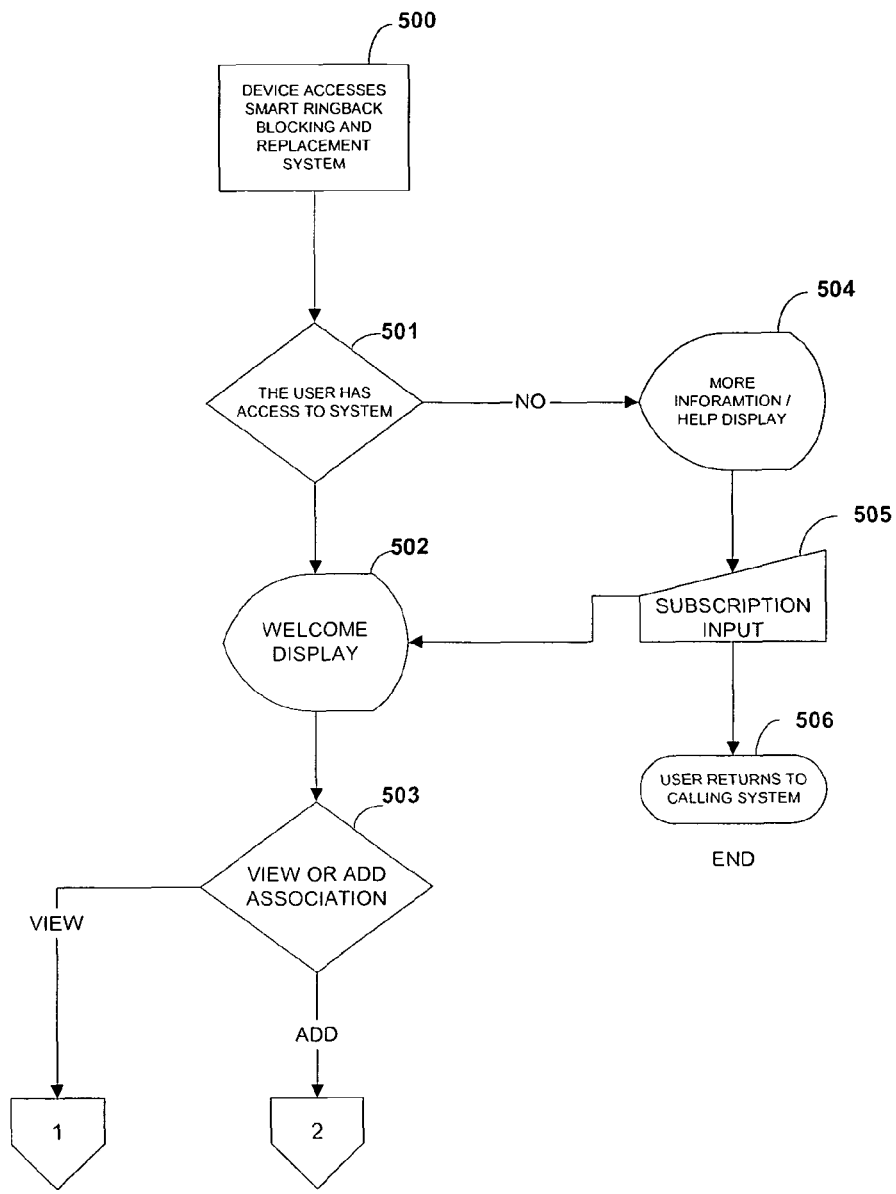
FIG. 5 is a flow diagram illustrating the initial interaction between a user and the smart ringback blocking and replacement system.

Now referring to FIG. 5, a flowchart of the preferred embodiment of the present invention is shown depicting the interaction between a user and the smart ringback blocking and replacement system. A user accesses the smart ringback blocking and replacement system 500 using one of the access methods described above. The first step of interaction between the user and the smart ringback blocking and replacement system is authorization routine 501 which verifies the current status of the user. Within authorization routine 501, user status is confirmed and verified to determine if access to the smart ringback blocking and replacement system should be granted. For example, if the user is not currently authorized to use the ringback blocking and replacement system, the user may be required to subscribe to the ringback blocking and replacement service. If the user is unauthorized, authorization routine 501 presents the user with help screen 504. Help screen 504 prompts the user to verify or confirm that subscription to the smart ringback blocking and replacement service is desired. If subscription to the service is requested, the user may be required to input billing information or personal identifying information, such as a password, PIN, or social security or account number, at subscription input stage 505 in order to complete subscription to the smart ringback blocking and replacement service. Data is provided to the system through hard, soft, attachable, or touch keys, or via voice recognition. If the subscription process does not complete successfully, or if the user chooses to cancel the subscription process, the user is returned to the calling system at exit stage 506.

In addition, if the user's account is determined to be presently delinquent, authorization stage 501 requests the user to provide immediate payment information via help screen 504 and subscription input stage 505 in order to bring the user's account into good standing. This may be achieved by authorizing an automatic one-time debit of the user's credit or checking account linked with the user's account, or by presenting the user with subscription input screen 505 so that the user might type, touch, or speak the user's billing information into the system. If the user's account is not determined to be in good standing at the conclusion of subscription input screen 505, the user is returned to the calling system at stage 506.

On the other hand, an authorized user, or a user who has presently become authorized or subscribed, is presented with welcome display 502 indicating that the user has successfully activated the smart ringback blocking and replacement system. The user's authorization level, which determines which smart associations the user is allowed to create, modify, or delete, is also accessed by the system. Authorization levels for users accessing the system directly from a network service provider (as opposed to a user communications device) may allow the user to create smart associations for communications devices other than the device currently accessing the system. Welcome display 502 may additionally be supplemented to display targeted content to the user accessing the smart ringback blocking and replacement system. The targeted content may be selected based on the current location of the user accessing the system (determined by the user's network address or telephone number), or targeted content may be determined based on user-supplied or user-derived interests. For example, a user accessing the system from a New York City area code might be presented with local advertising, music, news, or information important to New York City residents or visitors. The communications device accessing the system may optionally utilize positioning technology, such as GPS, to pinpoint a user's location. This coordinate data, if available, may be transferred to the system for the delivery of more precise advertising and announcements. For example, users accessing the system from within a sporting complex may receive targeted information about the sporting event, offers local to the sporting event and its attendees, or related advertising and announcements. In another example, a user who has expressed an interest in outdoor cycling via an online survey might receive content regarding bicycles and related supplies at welcome display 502. Additionally, welcome display 502 might alert the user to new or modified signal content available on the network since the user last accessed the system. The smart ringback blocking and replacement system includes logic for determining a genre or category of content preferred by the current user (based on previous content selections or user-supplied information) and automatically alerts the user to new signal content matching the user's interests. At view or add association stage 503, the user next chooses whether to view or add a ringback association. In one embodiment, the user enters the appropriate key (e.g., selects "1") to view or update a smart association, and the user enters a distinct appropriate key (e.g., selects "2") to add a new smart association. In another embodiment, at view or add association stage 503 the user presses a soft key on the user's handset to highlight and select "CHANGE" or "ADD" on the station's integrated display.

Figure 6:
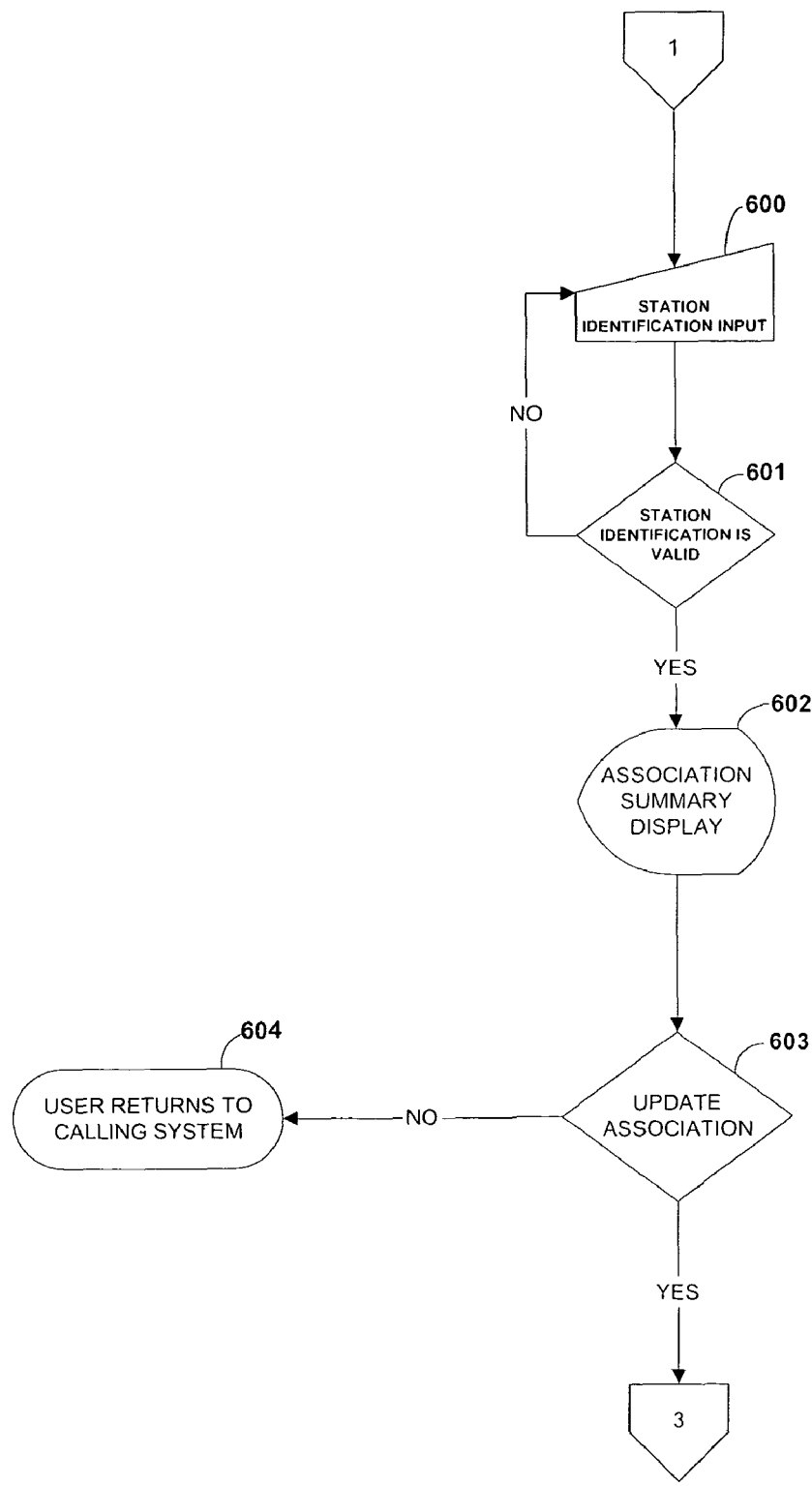
FIG. 6 is a flow diagram illustrating the interaction between a user and the smart ringback blocking and replacement system for viewing a smart association.

To view or update a smart association, the user follows the interaction depicted in FIG. 6. First, the user enters the desired station identification to view or update smart associations for at station identification input 600. If a user is accessing the system from a user communication device, station identification input 600 may be pre-filled with the current network address of the station accessing the system. Depending on the user's authorization level, station identification input 600 may not be editable. For instance, typical users may be allowed to only modify associations created by, or directly affecting, their own communications devices. Users accessing the system from an authorized network address or communications station, on the other hand, may be permitted to modify all smart associations. The system verifies the inputted identification at station validation stage 601, and if a valid identification is entered, the system presents a summary display 602 of the association with the specified calling station identification. If an invalid station identification is entered or the user is unauthorized to update an association for the entered station identification, the user is returned to station identification input 600 until a valid station identification is entered. Once the summary display 602 is presented to the user, the user can select to exit the system or update the association at update association stage 603. If the user chooses not to update the association, the system returns the user to the calling system at exit stage 604.

Figure 7:
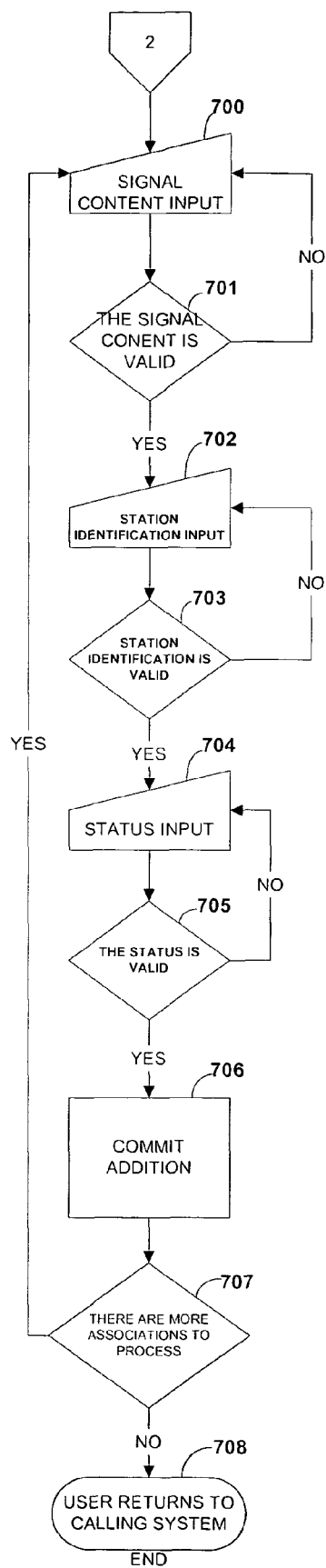
FIG. 7 is a flow diagram illustrating the interaction between a user and the smart ringback blocking and replacement system for adding a new smart association.

To add a new ringback replacement association, the user follows the interaction depicted in FIG. 7. The user first enters a unique alphanumeric corresponding to the desired ringback announcement at signal content input 700. Unique announcement alphanumeric codes can be accessible through numerous sources. For example, alphanumeric codes may be published on the communications network's website or the codes could be periodically downloaded to a file on the user's handset. In one embodiment, unique alphanumeric identification codes corresponding to available ringback content are cached in a file on the user's handset. In an alternate embodiment, the system directly queries the communications network for its list of available signal announcements stored on the network. If the signal announcement identification codes are cached on the handset in a file, this file may contain the title and the identification alphanumeric of each signal announcement stored on the network provider's storage device(s). In addition, a short description of the signal content and its genre are included, if available. The user looks up the desired signal announcement in the file and inputs the identification alphanumeric corresponding to the desired announcement. If the user desires to remove an association, the user enters the null signal identification alphanumeric at signal content input 700 (e.g., the user selects "0"). The null announcement erases an association and reverts the caller's ringback tone to the conventional tone.

At signal content input 700, the ringback system also includes a search feature to assist the user in finding the correct signal identification alphanumeric based on the first few letters of the title, genre, or artist of the content. For example, a user entering the letters "REGG" into the search engine might match the "reggae" musical genre, causing the handset-originated ringback replacement system to display a list of all musical content in the reggae genre available on the network to be used as ringback content. Next, the identification alphanumeric is verified by the system at signal content validation stage 601. Valid identification alphanumerics consist of all the existing and available signal announcements on the communications network or the null announcement (for reverting to conventional tones). If an invalid ringback identification is entered, the user repeats signal content input 700 until a valid identification alphanumeric is entered. After a valid ringback identification is selected, the user next enters the station identification of the communications station that the user wishes to associate with the signal announcement at station identification input 702. The user, if authorized, may enter a wildcard character (e.g., the number 0) to match all network addresses or select a group list. Station identification input 702 may be pre-filled and not editable, depending on the network address or communications station accessing the system and the user's authorization level. Station verification stage 703 verifies that the station identification entered is valid, and the system proceeds to station status input 704. If an invalid station identification is entered, the user returns to station identification input 702 until a valid identification is entered. At status input stage 704, the user enters the station status to be associated with the new smart association. Station statuses may be user or system defined. Status verification stage 705 checks the configured station status for correct syntax and commit stage 706 commits the new replacement ringback association to the communications network. Thus, the replacement signal addition may be added to the system in real-time, or, alternatively, if desired, the associations may be cached by the network for bulk additions at a later time. If the new ringback association specifies a network address that is already associated with a replacement ringback announcement, the new association takes precedence and overwrites the previous association. Lastly, a message is presented to the user at more associations to process stage 707 inquiring if there are more smart associations to process. An affirmative answer at more associations to process stage 707 restarts the entire process at signal content input 700 whereas a negative answer at more associations to process stage 707 exits the signal replacement system and returns the user to the calling system at exit stage 708.

Figure 8:
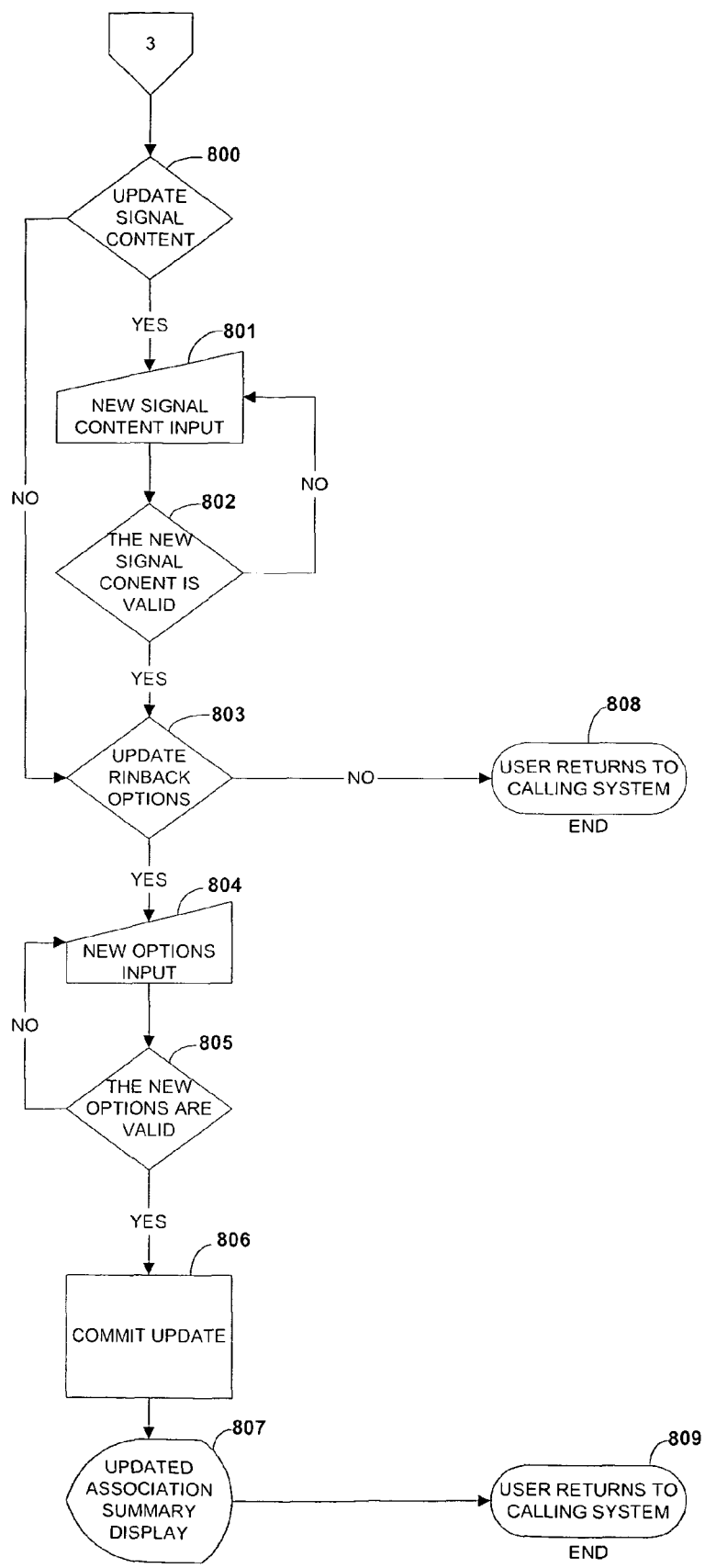
FIG. 8 is a flow diagram illustrating the interaction between a user and the smart ringback blocking and replacement system for modifying an already existing smart association.

If modifications are desired, the user's interaction with the system is depicted in FIG. 8. First, the user decides at update signal content stage 800 whether the ringback signal is to be updated. An affirmative answer at update signal content stage 800 brings the user to the signal identification input stage 801. The signal identification is validated at signal validation stage 802, and the user is presented with options update stage 803. The system also brings the user to options update stage 803 if a negative answer is received at update ringback content stage 800. At options update stage 803, if the user chooses not to process changes to the options of the association, then the user is brought to commit stage 806. If modifications to the options are desired, the user inputs these modifications at options input 804. The options are checked for appropriate syntax at options validation 805, and the options are committed to the communications network at commit stage 806. A summary display shows the updated association at summary display 807, and the user is returned to the calling system at exit stage 809.

Figure 9:
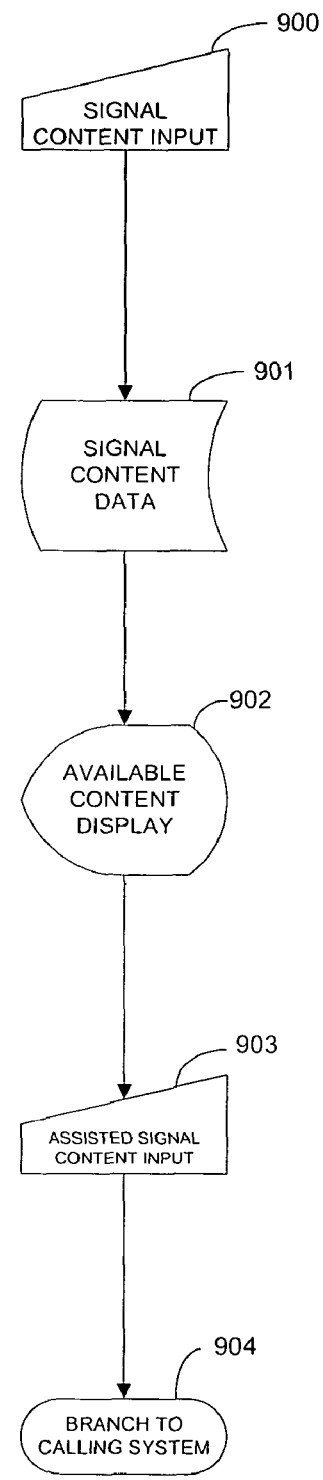
FIG. 9 is a flow diagram illustrating the interaction between a user and the smart ringback blocking and replacement system for displaying all signal content available on the network.

In an alternative embodiment of the present invention depicted in FIG. 9, the user, the network provider, or a third party at ringback content input 900 is presented with a menu of available ringback announcements to facilitate entry of ringback identification alphanumeric codes. These available announcements may be locally stored on the user's handset or station or stored within the communications network or on a third party or network storage device. Ringback content input 900 connects to ringback content data 901, which could be stored locally within the communications network (e.g., in a database or file) or an external device may be queried to retrieve available ringback content data. The data is formatted and presented to the user in user-friendly available content display 902. For example, the handset or station may have an integrated menu or list system for displaying lists of information. The user navigates through the list using hard, soft, or attachable keys (or via voice recognition), and the user highlights the desired ringback content. Assisted ringback content input 903 transfers the content identification alphanumeric corresponding to the selected ringback content to the handset-originated ringback replacement system in lieu of manually entering the alphanumeric. The user is returned to the calling system at branch stage 904.

Figure 10:
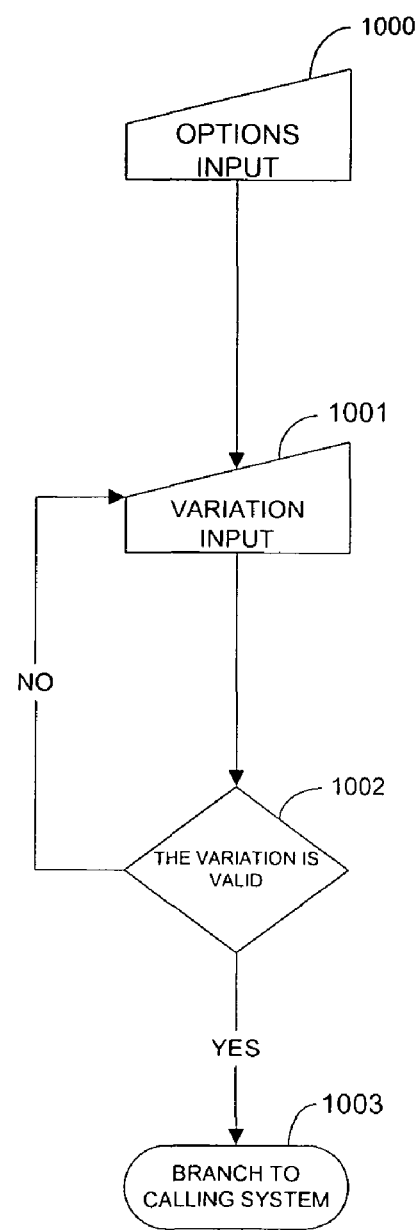
FIG. 10 is a flow diagram illustrating the interaction between a user and the smart ringback blocking and replacement system for selecting a playback variation.

In yet another embodiment of the present invention, the user, the network provider, or a third party is presented with additional playback options as depicted in FIG. 10. Options input 1000 is supplemented with variations input 1001 for the user to specify certain variations on how the ringback content is presented to the calling party. For example, the user can press the number "1" on the handset keypad to denote that only the replacement ringback should be played; number "2" to denote the playing of a single conventional ringback tone followed by the replacement ringback content; and, number "3" to denote the playing of the conventional ringback tone under the replacement ringback content (i.e. a blended conventional and replacement ringback tone). For example, the user enters the desired selection—"1," "2," or "3"—via the keypad on the user's handset or station at variation input 1001. The variation selection is validated by variation validation stage 1002. Certain ringback content may not be eligible for certain variation options (e.g., an interactive game may not be available to be played under a conventional ringback tone since the conventional ringback tone might interrupt the functionality of the game). These announcements are deemed invalid and the user is returned to variation input 1201 so that a valid variation input may be selected. Once a valid variation option is selected, the user is returned to the calling system at branch stage 1003.

Figure 11:
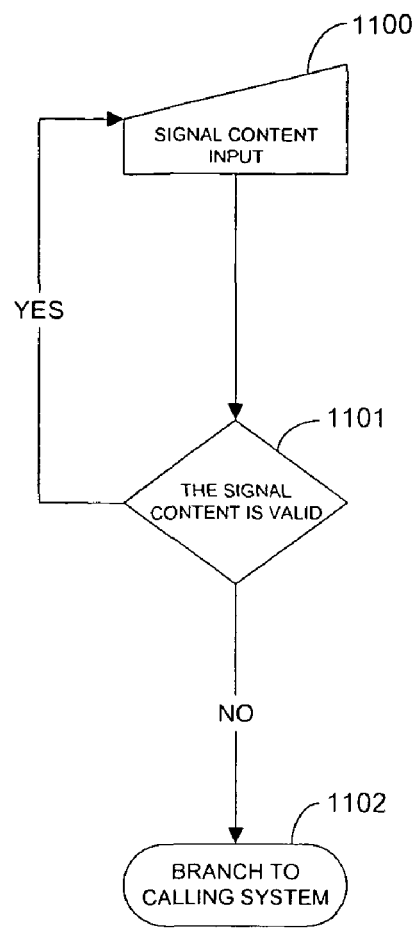
FIG. 11 is a flow diagram illustrating the interaction between a user and the smart ringback blocking and replacement system for creating an album of related announcements.

An additional embodiment of the present invention allows a sequence of more than one media file or announcement to be selected as depicted in FIG. 11. At signal content input 1100, the user, the network provider, or a third party enters a first ringback identification alphanumeric, followed by the pound ("#") or asterisk ("*") key and then enters another ringback identification alphanumeric followed by the pound ("#") or asterisk ("*") key. Each alphanumeric is verified by content validation stage 1101, and the user continues this process until satisfied with the sequence. The user either presses the pound ("#") or asterisk ("*") key twice in succession or selects an invalid signal content to effect the conclusion of the signal content input. The user is then returned to the calling system at branch stage 1102. This embodiment allows the user to create an "album" of signal announcement content for the purpose of cycling through the album sequence when replacing a call progress signal. For example, a user might select all the music songs from a particular music album by a certain artist. Whenever the station status matches the smart association station status associated with the album, a new song from the designated album is delivered to the user until all selected songs are delivered, at which point the album begins again. In another example, a user may specify a collection of news articles in a certain category, like sports headlines. Each station status matches the smart association station status associated with the album, an unheard sports headline is delivered to the user until all headlines are delivered, at which point the news album begins again.

Figure 12:
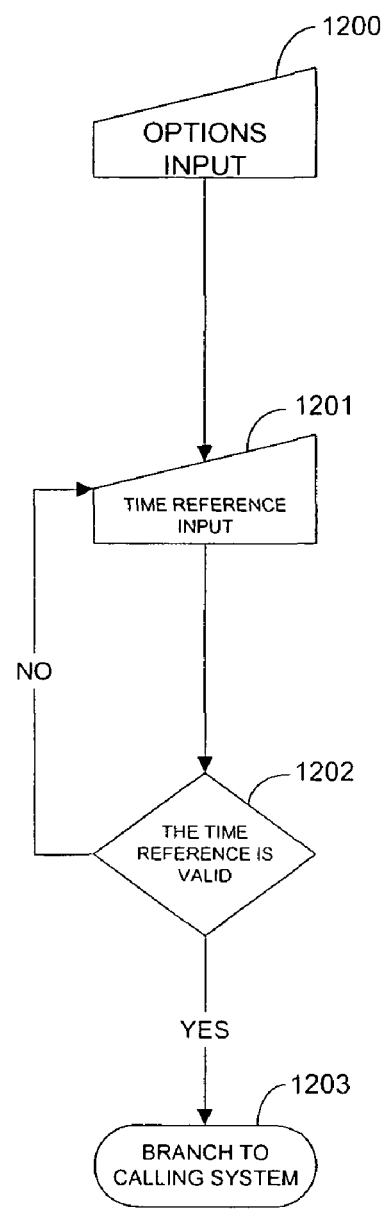
FIG. 12 is a flow diagram illustrating the interaction between a user and the smart ringback blocking and replacement system for associating a time reference or window with a smart association.

Another embodiment utilizes the clock located within or synchronized with the message generator for the user, the network provider, or a third party to select a time reference or window for the playing of replacement content. Options input 1200 is supplemented by time reference input 1201 of FIG. 12, where the user specifies the time of day, day of week, day of month, month of year, or some other time reference (e.g., absolute time measure from present time) to deliver the corresponding announcement. The time reference is verified at validation stage 1202, and if the time reference is deemed invalid (e.g., the time format is incorrect or otherwise invalid), the user is returned to time reference input 1201. Simple logic within the message generator or the network signaling system service node requires the additional matching of the selected time reference or window in addition to the appropriate station status. For example, this allows for a simple way to deliver the same signal content to a user's communications device during a specified time each day (e.g., midnight through 8 am when the user is typically asleep). The user is then returned to the calling system at branch stage 1203.

From the foregoing description of the preferred embodiments, which embodiments have been set forth in considerable detail for the purpose of making a complete disclosure of the present invention, it can be seen that the present invention comprises a system for delivering signal announcements to communications devices while the device matches a predetermined station status, as defined by the system or user of the system. It will be appreciated by those skilled in the art that changes could be made to the embodiment described above without departing from the broad inventive concept thereof. It is understood, therefore, that this invention is not limited to the particular embodiment disclosed, but it is intended to cover all modifications that are within the scope and spirit of the invention as defined by the appended claims.

What is claimed is:

1. A system for blocking and replacing ringback signals, the system comprising:
   a first communication station associated with a calling party and exhibiting one of a first plurality of station statuses;
   a second communication station associated with a called party;
   a communication device for associating at least one announcement with first information regarding at least one station status of said first communication station;
   wherein said associated first information is preselected by a calling party communication network connected to said first communication station or predetermined by the first communication station based on at least one parameter,
   wherein said communication device is associated with said calling party communication network,
   wherein said communication device receives second information regarding a first station status of said first communication station,
   wherein said communication device blocks ringback content transmitted by said second communication station or a called party communication network connected to said second communication station and delivers at least a portion of said at least one announcement to said first communication station when said second information regarding said first station status matches said first information,
   wherein said communication device terminates delivery of said at least a portion of said at least one announcement when said second communication station answers a call placed by said first communication station or when said call is answered by a recording.

2. A system as defined in claim 1 wherein said first station status is selected from the group consisting of idle and busy.

3. A system as defined in claim 1 wherein said at least one announcement is prerecorded.

4. A system as defined in claim 1 wherein said at least one announcement is live.

5. A system as defined in claim 1 wherein said at least one announcement comprises audio.

6. A system as defined in claim 1 wherein said at least one announcement comprises video.

7. A system as defined in claim 1 wherein said at least one announcement comprises data.

8. A system as defined in claim 1 wherein said at least one announcement comprises an album of related announcements.

9. A system as defined in claim 1 wherein said at least one announcement comprises advertising.

10. A system as defined in claim 1 wherein said at least one announcement comprises content selected from the group consisting of music, music videos, news, and informational content.

11. A system as defined in claim 1 wherein each of said first and second communication stations are selected from the group consisting of a telephone, a wireless telephone, a cellular telephone, a video telephone, a computer, a personal digital assistant, a television, and a multimedia handset.

12. A system as defined in claim 1 wherein each of said first and second communication stations comprises a communication network.

13. A system as defined in claim 1 wherein said communication device comprises a communication network.

14. A system as defined in claim 1 wherein said first communication station comprises an integrated display unit featuring a menu system.

15. A system as defined in claim 14 wherein said menu system displays announcements available from said communication device.

16. A system as defined in claim 1 wherein each of said calling and called party communication networks are selected from the group consisting of a circuit-switched network, a packet-based network, the Internet, a local area network, a wide area network, a virtual private network, a metropolitan area network, a broadcast network, a wireless network, and a cellular network.

17. A method for blocking and replacing ringback signals, the method comprising the steps of:
    associating at least one announcement with first information regarding at least one station status of a first communication station;
    receiving second information regarding a first station status of said first communication station;
    blocking ringback content transmitted by a second communication station or a communication network associated with said second communication station and delivering at least a portion of said at least one announcement to said first communication station when said second information matches said first information; and
    terminating delivery of said at least a portion of said at least one announcement when said second communication station answers a call placed by said first communication station or said call is answered by a recording;
    wherein said associated first information is preselected by a network connected to said first communication station or predetermined by said first communication station based on at least one parameter,
    wherein said first communication station is of or associated with a calling party, and
    wherein said second communication station is of or associated with a called party.

18. A method as defined in claim 17 wherein said first station status is selected from the group consisting of idle and busy.

19. A method as defined in claim 17 wherein said association is created by said first communication station.

20. A method as defined in claim 17 wherein said association is created by a communication network connected to said first communication station.

21. A method as defined in claim 17 wherein said association is created by an intermediate network service provider.

22. A method as defined in claim 17 wherein said association is created by a third party.

23. A method as defined in claim 17 wherein said method further comprises the step of selectively blocking the reception of said at least one announcement by said first communication station.

24. A method as defined in claim 17 wherein said at least one announcement is selected by said first communication station.

25. A method as defined in claim 24 wherein said at least one announcement is live.

26. A method as defined in claim 24 wherein said at least one announcement comprises audio.

27. A method as defined in claim 24 wherein said at least one announcement comprises video.

28. A method as defined in claim 24 wherein said at least one announcement comprises data.

29. A method as defined in claim 24 wherein said at least one announcement comprises an album of related announcements.

30. A method as defined in claim 24 wherein said at least one announcement comprises advertising.

31. A method as defined in claim 24 wherein said at least one announcement comprises content selected from the group consisting of music, music videos, news, and informational content.

* * * * *